United States Patent
Mori et al.

(10) Patent No.: US 7,210,153 B2
(45) Date of Patent: Apr. 24, 2007

(54) DISK APPARATUS HAVING OPTICAL PICKUP

(75) Inventors: Fumiaki Mori, Osaka (JP); Suehiro Harada, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 373 days.

(21) Appl. No.: 10/863,520

(22) Filed: Jun. 9, 2004

(65) Prior Publication Data

US 2005/0022219 A1    Jan. 27, 2005

(30) Foreign Application Priority Data

Jun. 10, 2003   (JP)   ............ P.2003-165042

(51) Int. Cl.
*G11B 7/085* (2006.01)
(52) U.S. Cl. .................................... 720/677
(58) Field of Classification Search ............ 720/677, 720/679, 663, 665, 664; 369/219.1, 220, 369/223, 244.1, 246, 248, 247.1, 249
See application file for complete search history.

(56) References Cited

U.S. PATENT DOCUMENTS 6,046,974 A * 4/2000 Uehara ................ 720/663
6,983,473 B2 * 1/2006 Osada et al. ............ 720/663
2002/0101814 A1 * 8/2002 Kato et al. .............. 369/249

FOREIGN PATENT DOCUMENTS

| JP | 55-139666 | 10/1980 |
| JP | A-61-175712 | 8/1986 |
| JP | 8-138332 | 5/1996 |
| JP | A-2001-222823 | 8/2001 |
| JP | A-2003-077234 | 3/2003 |

* cited by examiner

*Primary Examiner*—Allen Cao
(74) *Attorney, Agent, or Firm*—Morgan, Lewis & Bockius LLP

(57) ABSTRACT

A base of an optical pickup is provided with a bearing slidably supported by a guide shaft and an engagement portion guided by a guide rail. The bearing includes a pair of front and rear bearing elements. A concave portion and a pressing piece having a shape that enables forming die extraction in a direction orthogonal to the direction of the axis line are provided on at least one bearing element so as to be displaced.

5 Claims, 7 Drawing Sheets

PRIOR ART

PRIOR ART

DISK APPARATUS HAVING OPTICAL PICKUP

BACKGROUND OF THE INVENTION

1. Field of the Invention

The present invention relates to a disk apparatus having an optical pickup, and more particularly, to an apparatus having an optical pickup whose movement in the direction of the radius of the disk is required to be guided with high accuracy by a guide shaft that is circular in cross section.

2. Description of the Related Art

FIG. 8 is a schematic plan view showing the general structure of an optical pickup attached part of this type of disk apparatus. In the figure, reference numeral 1 denotes a chassis, and a turntable 2 fixed to the rotation shaft of a non-illustrated driving motor is disposed in a predetermined position of the chassis 1. The chassis 1 has an opening 3, and in an inner area of the opening 3, an optical pickup 10 is moved in a far and near direction with respect to the turntable 2, that is, in the direction of the radius of a disk D rotated by the turntable 2 (the direction of the arrow R). The motor serving as a movement driving source for moving the optical pickup 10 is not shown.

The optical pickup 10 is formed by mounting, on a base 20 formed of a synthetic resin molding, an optical system that has an objective lens 12 and a non-illustrated optical axis adjusting mechanism and scans a disk. The base 20 is provided with a bearing 30 including a pair of front and rear bearing elements 31 and 32 provided on one side and in the lateral direction and an engagement portion 40 provided on the other side end in the lateral direction, the bearing 30 is swingably supported by a guide shaft 50, and the engagement portion 40 is guided by a guide rail 60 disposed parallel to the guide shaft 50.

It is found that in such an optical pickup 10, the position of engagement between the guide rail 60 and the engagement portion 40 is not required of a high accuracy demanded for the engagement portion 40 to be guided by the guide rail 60 without any backlash although the bearing 30 is required to be guided by the guide shaft 50 with high accuracy without any backlash. For this reason, as shown in the schematic perspective view of FIG. 9, the engagement portion 40 has a pair of protruding pieces 41 and 42 slidably sandwiching, in the longitudinal direction, the guide rail 60 including a round bar that is circular in cross section, and play S in which the engagement portion 40 is displaceable in the lateral direction with respect to the guide rail 60 is frequently secured between the protruding pieces 41 and 42.

Under such conditions, an optical pickup of a conventional disk apparatus will be described with reference to FIG. 10 through FIG. 12. FIG. 10 is a schematic bottom view showing a relevant part of the optical pickup for which the part is viewed from the underside. FIG. 11 is a schematic cross-sectional view taken on the line XI—XI of FIG. 10. FIG. 12 is an enlarged view on the arrow XII of FIG. 10.

In this optical pickup, the pair of front and rear bearing elements 31 and 32 of the bearing 30 provided on one side end, in the lateral direction, of the base 20 formed of a synthetic resin molding have round holes 33 and 34, and cylindrical sliding surfaces 35 and 36 including the inner circumferential surfaces of the round holes 33 and 34 are slidably in contact with the guide shaft 50 that is circular in cross section (see FIG. 8) with high accuracy without any backlash. In FIG. 10 and FIG. 12, reference numeral 21 denotes a rack to which the output of a non-illustrated motor is transmitted. In the optical pickup shown in FIG. 10 through FIG. 12, an engagement portion provided on the other side end, in the lateral direction, of the base 20 has a structure similar to that of the engagement portion 40 described with reference to FIG. 8, and is slidably engaged with the guide rail 60 described with reference to FIG. 8 with a similar structure. The other structures are similar to those described with reference to FIG. 8.

In the conventional disk apparatus having such an optical pickup 10, when the base 20 integrally provided with the bearing 30 is molded of a synthetic resin, since the front and rear bearing elements 31 and 32 constituting the bearing 30 have the round holes 33 and 34, a metal mold slide pin 70 for molding shown by alternate long and short dashed lines in FIG. 10 is used. Since the metal mold slide pin 70 elongates from a non-illustrated metal mold main part and a single metal mold slide pin 70 is used for forming both the round holes 33 and 34 of the front and rear bearing elements 31 and 32, it is necessary that the metal mold slide pin 70 elongating from the metal mold main part be long enough to form both of the round holes 33 and 34 of the front and rear bearing elements 31 and 32, and further, the mold releasing stroke when the metal mold slide pin 70 is taken out in the direction of the arrow A of FIG. 10 at the time of mold releasing after molding is long.

On the contrary, in the conventional apparatus having the optical pickup 10, the engagement portion having a similar structure to the engagement portion 40 described with reference to FIG. 8 or 9 can be molded by use of a general-purpose split-cavity mold moved toward a side of the base 20 for mold releasing without the use of the above-mentioned metal mold slide pin 70, because it has the pair of upper and lower protruding pieces 41 and 42 and the space between the protruding pieces 41 and 42 is open toward the side of the optical pickup.

On the contrary, a prior art example describes a disk drive apparatus having an optical pickup where a bearing including two front and rear bearing elements is slidably supported by a main guide shaft (corresponding to the above-mentioned guide shaft) and an engagement portion guided by a round-bar-shaped sub guide shaft (corresponding to the above-mentioned guide rail) disposed parallel to the guide shaft is provided (for example, see JP-A-2001-222823). The structure of this disk drive apparatus is similar to that of the above-mentioned conventional example in that the main guide shaft is inserted in round holes of the front and rear bearing elements and the engagement portion has protruding pieces that sandwich the sub guide shaft in the longitudinal direction.

Another prior art example mentions an optical pickup bearing mechanism where a first bearing portion (corresponding to the above-mentioned bearing) is slidably supported by a first guide rod (corresponding to the above-mentioned guide shaft) and a second bearing portion (corresponding to the above-mentioned engagement portion) is guided by a second guide rod (corresponding to the above-mentioned guide rail) (for example, see JP-A-2003-77234). This example describes, as the structure of the second bearing not required of very high accuracy, that the second guide rod is slidably sandwiched, in the longitudinal direction by use of spring tension, between a first sliding portion on the side of the optical pickup base and a second sliding portion on the side of a holder attached to the optical pickup base.

Still another prior art example mentions a guide mechanism where two front and rear U-shaped holders are provided on one side end of a base on which a magnetic head is mounted, and a cylindrical bearing in which a guide rod is slidably inserted is held by these holders (for example, see JP-A-61-175712).

When a structure where the round holes 33 and 34 are provided in the front and rear bearing elements 31 and 32 of the bearing 30 and the guide shaft 50 is inserted in the round holes 33 and 34 is adopted in order to satisfy the demand for guiding the bearing 30 by the guide shaft 50 with high accuracy without any backlash like the optical pickup of the conventional disk apparatus described with reference to FIG. 10 through FIG. 12, it is required to use an elongate metal mold slide pin 70 as the forming die for the round holes 33 and 34 as described with reference to FIG. 10.

However, when such an elongate metal mold slide pin 70 is used, the overall size of the molding machine for molding the base 20 is increased in accordance with the length of the metal mold slide pin 70 and the number of necessary metal mold parts is increased, so that although the engagement portion 40 (see FIG. 9) can be molded by use of a general-purpose split-cavity mold, the cost of the metal mold is increased, so that the cost of molding the base 20 is increased. Moreover, the elongate metal mold slide pin 70 readily deforms or breaks because of being long and further, the cost required for replacing the metal mold slide pin 70 is high.

Moreover, the sliding surfaces 35 and 36 including the inner circumferential surfaces of the round holes 33 and 34 of the front and rear bearing elements 31 and 32 are straight in the direction of the axis line of the metal mold slide pin 70 because they are molded by the metal mold slide pin 70, so that the area of contact with the guide shaft is large and this can increase the load on the motor for driving the optical pickup.

The disk drive apparatus described in JP-A-2001-222823 has a similar problem as the conventional example because the optical pickup thereof has the structure where the bearing having round holes is slidably supported by the main guide shaft and the engagement portion having upper and lower protruding pieces is slidably engaged with the sub guide shaft. Moreover, the art described in JP-A-2003-77234 cannot be a solution to the above-mentioned problem because it merely provides a structure of the second bearing portion not required of very high accuracy. Further, the mechanism described in JP-A-61-175712 cannot be a solution to the above-mentioned problem, either, because it has the structure where the cylindrical bearing in which the guide rod is slidably inserted is held by the U-shaped holders.

SUMMARY OF THE INVENTION

The present invention is made in view of the problem and circumstances mentioned above, and an object thereof is to provide a disk apparatus having an optical pickup where the demand for guiding the bearing by the guide shaft with high accuracy without any backlash is satisfied, the bearing can be molded of a synthetic resin integrally with the base without the use of a metal mold slide pin or even if a metal mold slide pin is used, by use of a short metal mold slide pin and a general-purpose split-cavity mold, and the area of contact between the bearing and the guide shaft can be reduced to reduce the load on the motor.

A disk apparatus having an optical pickup according to the present invention is such that in a disk apparatus having an optical pickup where a base formed of a synthetic resin molding on which an optical system that scans a disk being rotated is mounted has a bearing slidably supported by a guide shaft that is circular in cross section and an engagement portion guided by a guide rail disposed parallel to the guide shaft, and the guide shaft is inserted in a round hole having a cylindrical sliding surface for which a hole is provided in the bearing; instead of providing the round hole in the bearing, a concave portion having a shape that enables forming die extraction in a direction orthogonal to a direction of an axis line and a pressing piece pressing the guide shaft inserted in the concave portion to thereby prevent the guide shaft from coming out of an open part of the concave portion are provided on the bearing so as to be displaced in the direction of the axis line, and an inner surface of the concave portion and a surface of the pressing piece constitute a sliding surface for the guide shaft.

According to this structure, the concave portion of the bearing can be molded by use of, for example, a split-cavity mold without the use of a metal mold slide pin, and the guide shaft inserted in the concave portion is pressed by the pressing piece to be prevented from coming out of the concave portion. Moreover, since the inner surface of the concave portion and the surface of the pressing piece constitute the sliding surface for the guide shaft, the demand for guiding the bearing by the guide shaft with high accuracy without any backlash is satisfied, and the bearing can be molded of a synthetic resin integrally with the base without the use of a metal mold slide pin. In addition, since the guide shaft is in contact only with the sliding surface constituted by the inner surface of the concave portion and the surface of the pressing piece and the entire peripheral surface of the guide shaft is not in contact with the sliding surface, the area of contact is reduced accordingly to reduce the load on the motor.

According to the present invention, the following structure may be adopted: The concave portion has a bottom surface slidably sandwiching the guide shaft in a first radius direction in cooperation with the surface of the pressing piece and a pair of opposing surfaces provided so as to rise from both ends of the bottom surface and slidably sandwich the guide shaft in a second radius direction orthogonal to the first radius direction. According to this structure, since the guide shaft is in contact only with the four surfaces of the surface of the pressing piece and the bottom surface and the pair of opposing surfaces of the concave portion, the area of contact can be significantly reduced to reduce the load on the motor.

According to the present invention, the following structure may be adopted: The bearing includes a pair of front and rear bearing elements slidably supported by the guide shaft, and at least one of the bearing elements has the concave portion and the pressing piece. According to this structure, since the concave portion of one of the bearing elements can be molded by use of, for example, a split-cavity mold without the use of a metal mold slide pin, even if the sliding surface of the other bearing element is molded by use of a metal mold slide pin, a short metal mold slide pin can be used, so that the overall size of the molding machine for molding the base can be reduced accordingly and the number of necessary metal mold parts can be small. This reduces the cost of the metal mold and the cost for molding the base. Moreover, the metal mold slide pin hardly deforms or breaks, so that the cost required for replacing the metal mold slide pin is low.

According to the present invention, it is preferable that the guide rail includes a round bar that is circular in cross section and the engagement portion has a pair of protruding pieces slidably sandwiching the round bar in a radius direction. According to this structure, the engagement portion can be molded of a synthetic resin integrally with the base by use of a general-purpose split-cavity mold.

A disk apparatus having an optical pickup according to the present invention is further embodied by adopting the following structure: In a disk apparatus having an optical pickup where a base formed of a synthetic resin molding on which an optical system that scans a disk being rotated is mounted has a bearing slidably supported by a guide shaft that is circular in cross section and an engagement portion guided by a guide rail disposed parallel to the guide shaft, and the guide shaft is inserted in a round hole having a cylindrical sliding surface for which a hole is provided in the bearing; the bearing includes a pair of front and rear bearing elements provided on one side end of the base and slidably supported by the guide shaft, the guide rail includes a round bar that is circular in cross section, and the engagement portion has a pair of protruding pieces provided on the other side end of the base and slidably sandwiches the round bar in a longitudinal direction; instead of providing the round hole in the bearing, a concave portion having a shape that enables forming die extraction in a direction orthogonal to a direction of an axis line and a pressing piece pressing the guide shaft inserted in the concave portion to thereby prevent the guide shaft from coming out of an open part of the concave portion are provided on at least one of the bearing elements so as to be displaced in the direction of the axis line; and the concave portion has a bottom surface slidably sandwiching the guide shaft in the longitudinal direction in cooperation with a flat surface of the pressing piece and a pair of opposing surfaces provided so as to rise from both ends of the bottom surface and slidably sandwich the guide shaft in a lateral direction, the flat surface of the pressing piece and the bottom surface and the pair of opposing surfaces of the concave portion constitute a sliding surface for the guide shaft, and the bottom surface and the pair of opposing surfaces of the concave portion are each formed as a curved surface extending in the direction of the axis line of the guide shaft. The workings of this invention will be described with reference to the following embodiment.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
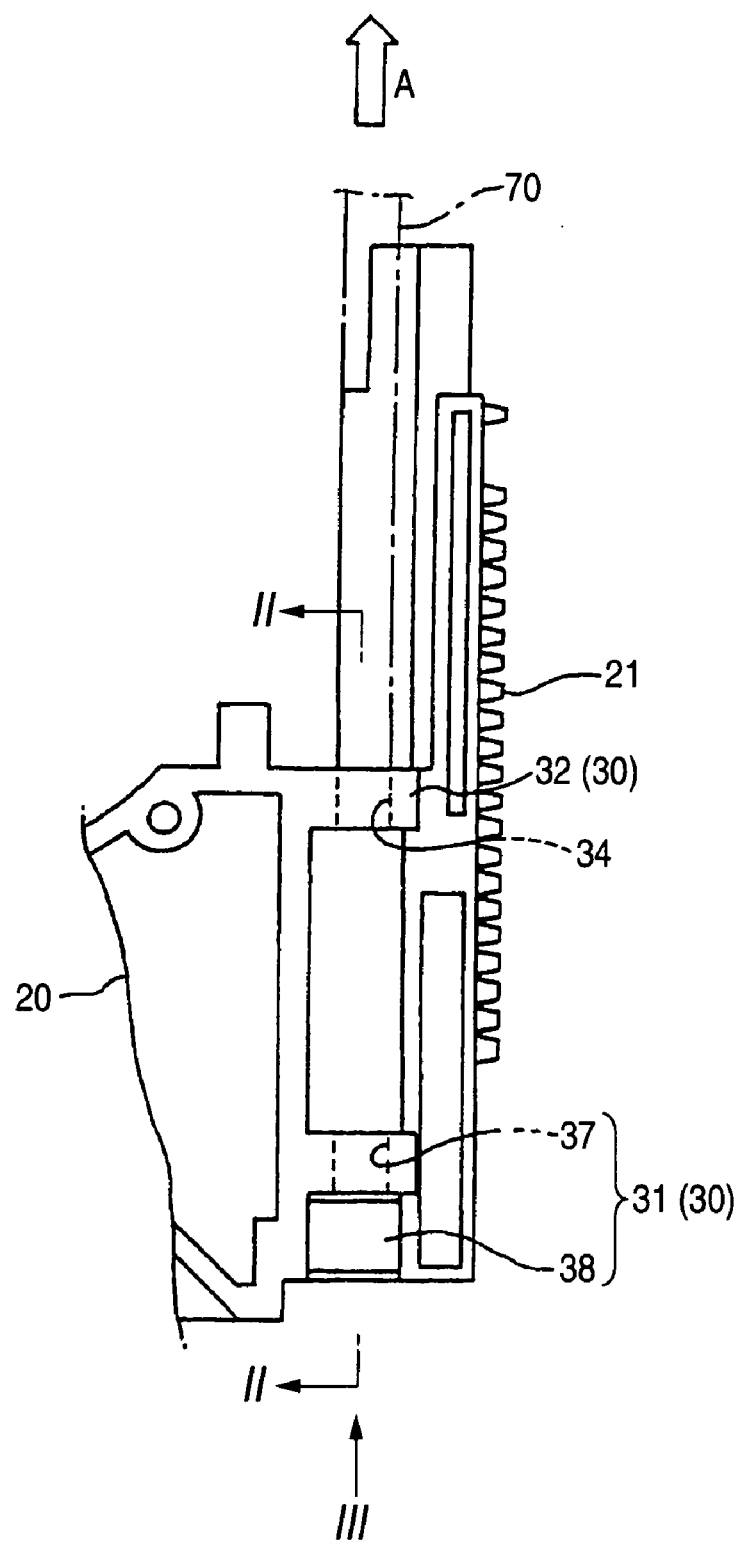
FIG. 1 is a schematic bottom view showing a relevant part of an optical pickup adopted by a disk apparatus according to the present invention for which a part is viewed from the underside.
Figure 2:
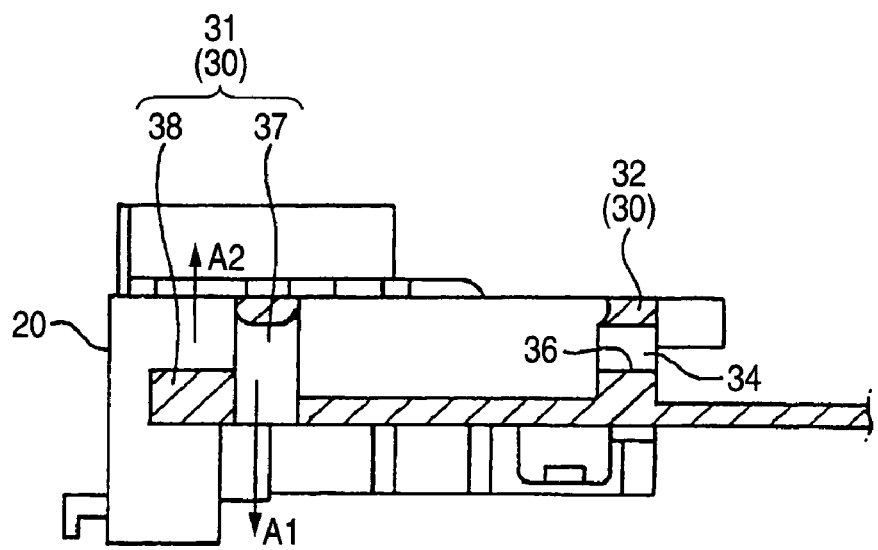
FIG. 2 is a schematic cross-sectional view taken on the line II—II of FIG. 1.
Figure 3:
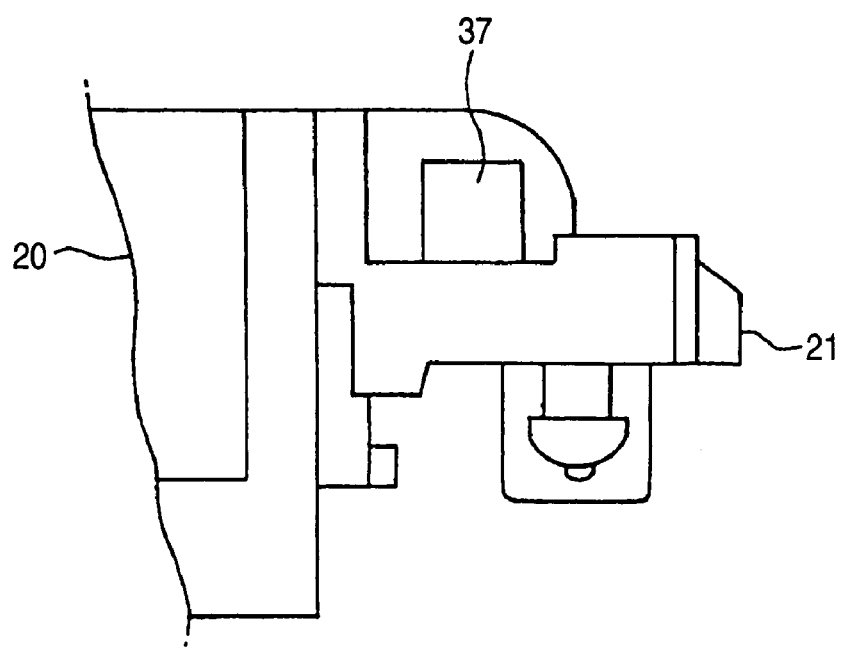
FIG. 3 is an enlarged view on the arrow III of FIG. 1.
Figure 4:
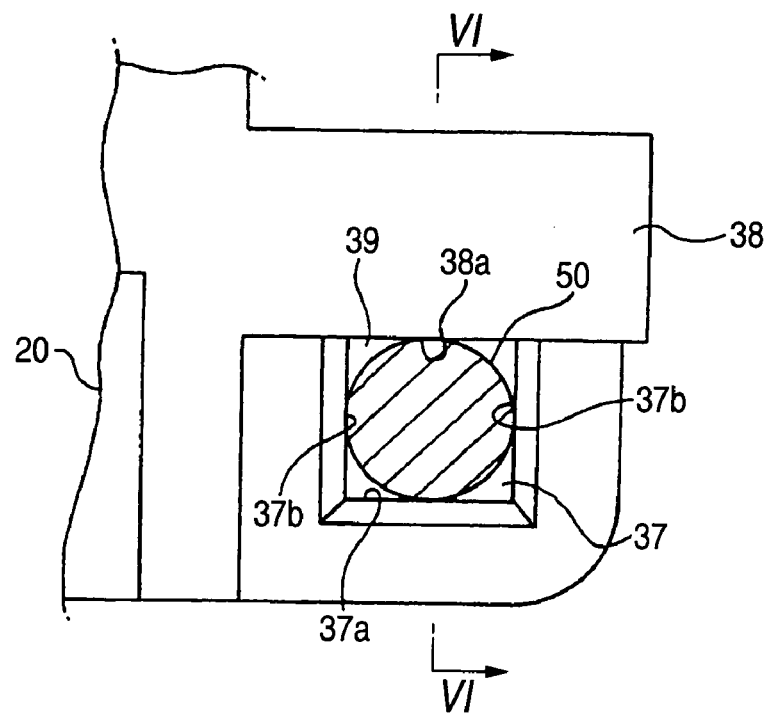
FIG. 4 is an enlarged front view of a bearing.
Figure 5:
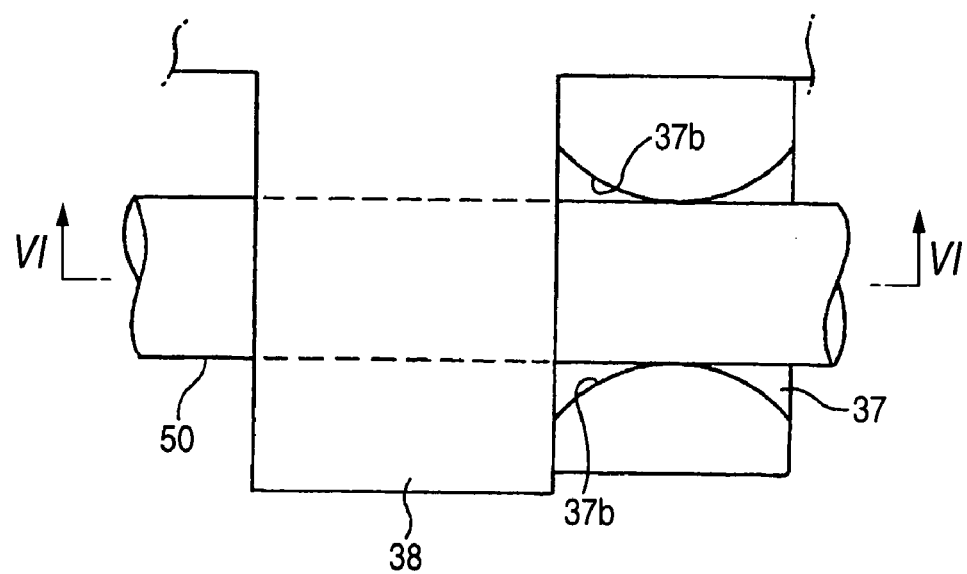
FIG. 5 is an enlarged plan view of the bearing.
Figure 6:
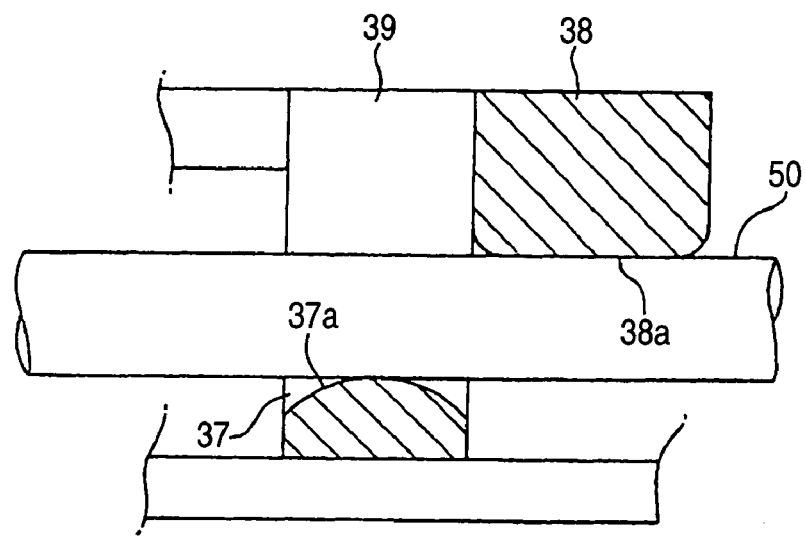
FIG. 6 is a cross-sectional view taken on the line VI—VI of FIG. 5.
Figure 7:
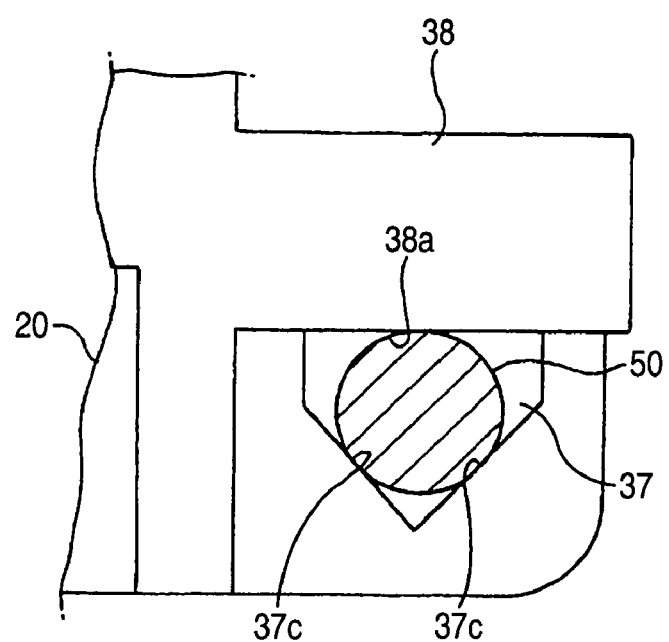
FIG. 7 is an enlarged front view showing a modification of the bearing for which a view corresponds to FIG. 4.

FIG. 1 is a schematic bottom view showing a relevant part of an optical pickup adopted by a disk apparatus according to the present invention for which a part is viewed from the underside. FIG. 2 is a schematic cross-sectional view taken on the line II—II of FIG. 1. FIG. 3 is an enlarged view on the arrow III of FIG. 1. FIG. 4 is an enlarged front view of a bearing 30. FIG. 5 is an enlarged plan view of the bearing 30. FIG. 6 is a cross-sectional view taken on the line VI—VI of FIG. 5. FIG. 7 is an enlarged front view showing a modification of the bearing 30 for which a view corresponds to FIG. 4.

Figure 8:
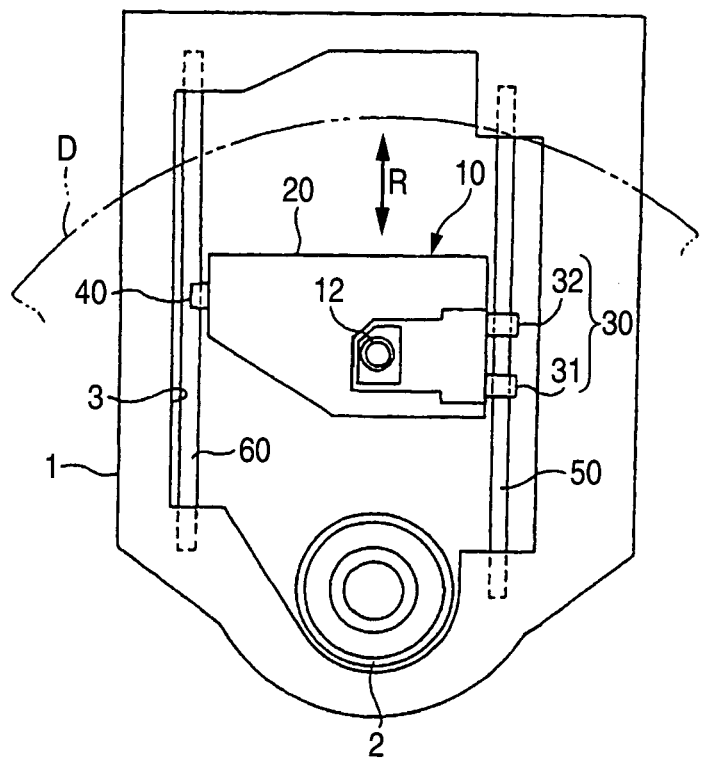
FIG. 8 is a schematic plan view showing the general structure of an optical pickup attached part of a disk apparatus.

In this optical pickup, of a pair of front and rear bearing elements 31 and 32 of the bearing 30 provided on one side end, in the lateral direction, of a base 20 formed of a synthetic resin molding, the rear bearing element 32 has a round hole 34, and a cylindrical sliding member 36 including the inner circumferential surface of the round hole 34 is slidably in contact with a guide shaft 50 that is circular in cross section (see FIG. 8), with high accuracy without any backlash. On the other hand, the front bearing element 31 has a concave portion 37 and a pressing piece 38 disposed so as to be displaced from the concave portion 37 in the direction of the axis line of the concave portion 37 (coinciding with the direction of the axis line of the guide shaft 50). As shown in FIG. 4 through FIG. 6, the concave portion 37 has a bottom surface 37a and a pair of opposing surfaces 37b provided so as to rise perpendicularly from the right and left ends of the bottom surface 37a, and is open at the top. The open part is denoted by reference numeral 39. A lower surface 38a of the pressing piece 38 is a flat surface. The bottom surface 37a of the concave portion 37 slidably sandwiches the guide shaft 50 that is circular in cross section in the longitudinal direction (the first radius direction) in cooperation with the lower surface 38a of the pressing piece 38, and the pair of opposing surfaces 37b of the concave portion 37 slidably sandwich the guide shaft 50 in the lateral direction. Thus, the lower surface 38a of the pressing piece 38 and the bottom surface 37a and the pair of opposing surfaces 37b of the concave portion 37 constitute the sliding surface for the guide shaft 50, and a gap that causes backlash is absent at the position of contact between the sliding surface and the guide shaft 50.

In FIG. 1 and FIG. 3, reference numeral 21 denotes a rack to which the output of a non-illustrated motor is transmitted. In the optical pickup shown in FIG. 1 through FIG. 6, an engagement portion provided on the other side end, in the lateral direction, of the base 20 has a structure similar to that of the engagement portion 40 described with reference to FIG. 8, and is slidably engaged with the guide rail 60 described with reference to FIG. 8 with a similar structure. The other structures are similar to those described with reference to FIG. 8.

In the disk apparatus provided with the optical pickup having the above-described structure, the base 20 is smoothly driven by being supported with high accuracy without any backlash by the guide shaft 50 that is circular in cross section by the pair of front and rear bearing elements 31 and 32 constituting the bearing 30 on one side end thereof, and the engagement portion 40 on the other side end thereof (see FIG. 8) is guided by the guide rail 60. Thus, a demand for guiding the bearing 30 by the guide shaft 50 with high accuracy without any backlash is satisfied. Moreover, as is apparent from FIG. 4, since the guide shaft 50 is in contact with the four surfaces of the lower surface 38a of the pressing piece 38 and the bottom surface 37a and the pair of opposing surfaces 37b of the concave portion 37 only at surrounding four positions at the front bearing element 31, the area of contact between the bearing 30 and the guide shaft 50 is significantly reduced, so that the load on the motor is reduced.

Figure 10:
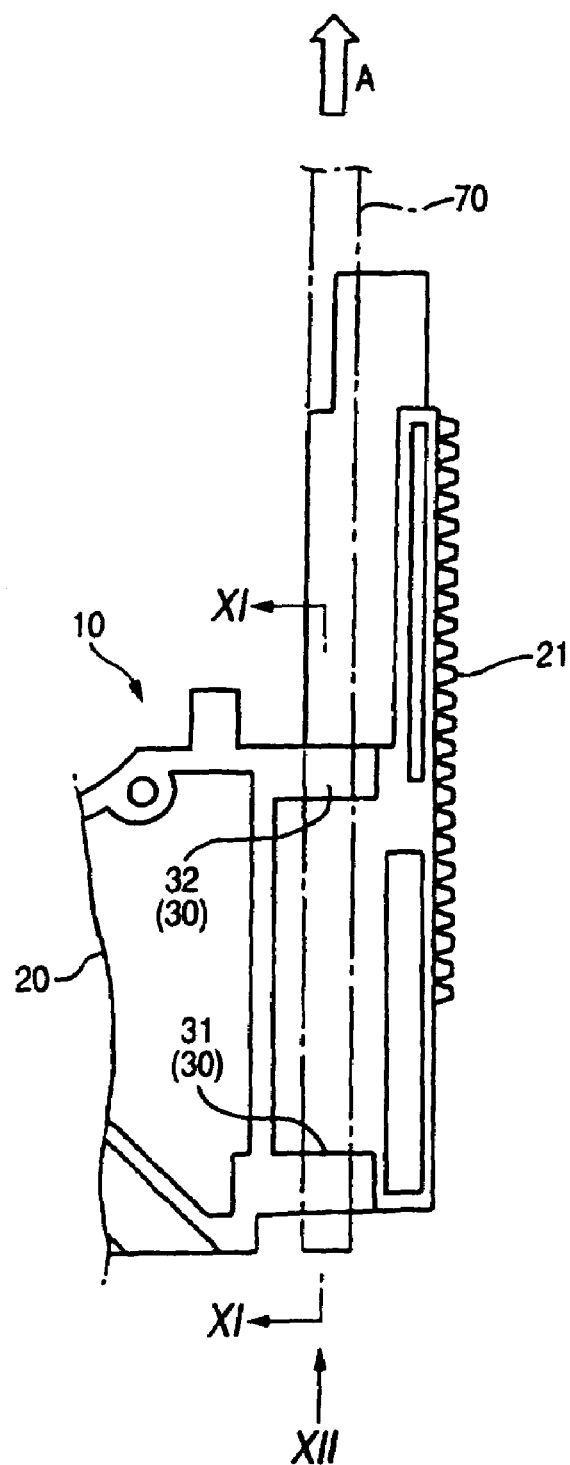
FIG. 10 is a schematic bottom view showing a relevant part of an optical pickup adopted by a conventional disk apparatus for which a part is viewed from the underside.
Figure 11:
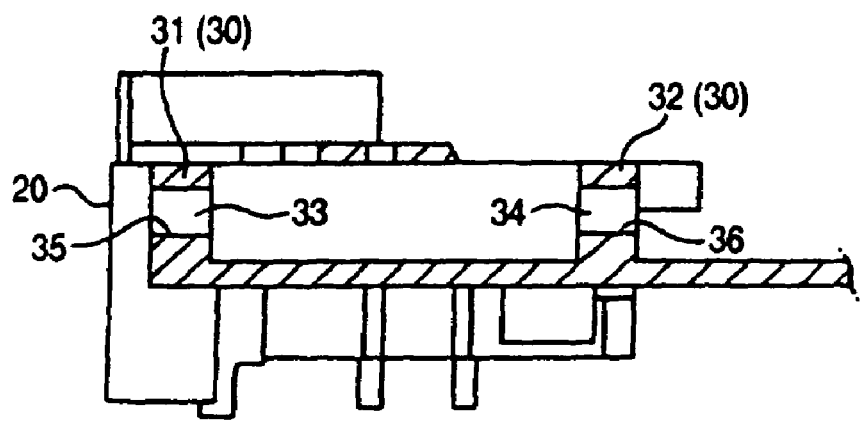
FIG. 11 is a schematic cross-sectional view taken on the line XI—XI of FIG. 10.
Figure 12:
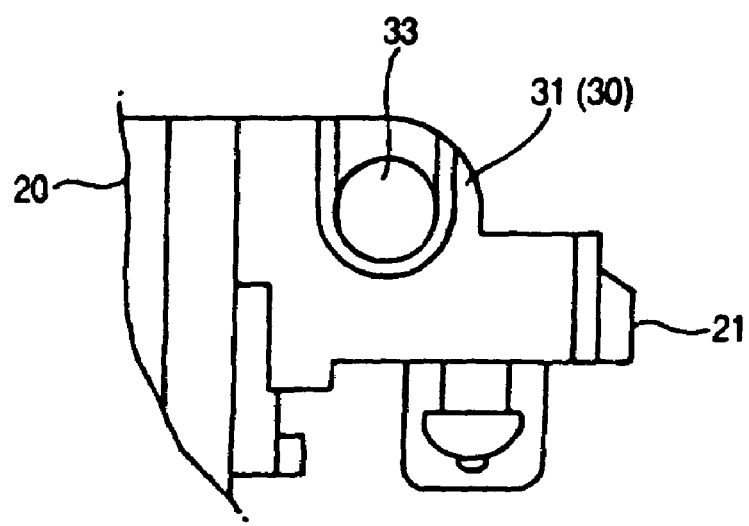
FIG. 12 is an enlarged view on the arrow XII of FIG. 10.

The concave portion 37 and the pressing piece 38 of the front bearing element 31 can be molded without the use of a metal mold slide pin. That is, the concave portion 37 can be molded by use of a non-illustrated split-cavity mold, and mold releasing can be performed by moving the split-cavity mold toward the upper side of the base 20 (in FIG. 2, the lower side is the upper side of the base 20) as shown by the arrow A1 of FIG. 2. The pressing piece 38 can also be molded by use of a non-illustrated split-cavity mold, and mold releasing can be performed by moving the split-cavity mold toward the lower side of the base 20 as shown by the arrow A2 of FIG. 2. On the contrary, the round hole 33 of the rear bearing element 32 is molded by use of a metal mold slide pin 70 shown by the alternate long and short dashed lines in FIG. 1. However, since the metal mold slide pin 70 for molding the round hole 33 of the rear bearing element 32 is not used also for molding the front bearing element 31, it is necessary only that the metal mold slide pin 70 extending from the metal mold main part (not shown) be long enough for molding the round hole 33 of the rear bearing element 32, and such a metal mold slide pin 70 may be shorter than that described with reference to FIG. 10. Consequently, the mold releasing stroke when the metal mold slide pin 70 is taken out in the direction of the arrow A of FIG. 1 at the time of mold releasing after molding may be small. From this, the overall size of the molding machine for molding the base 20 can be reduced, and the number of necessary metal mold parts can be reduced. Further, the metal mold slide pin 70 hardly deforms or breaks, so that the cost required for replacing the metal mold slide pin is low.

Figure 9:
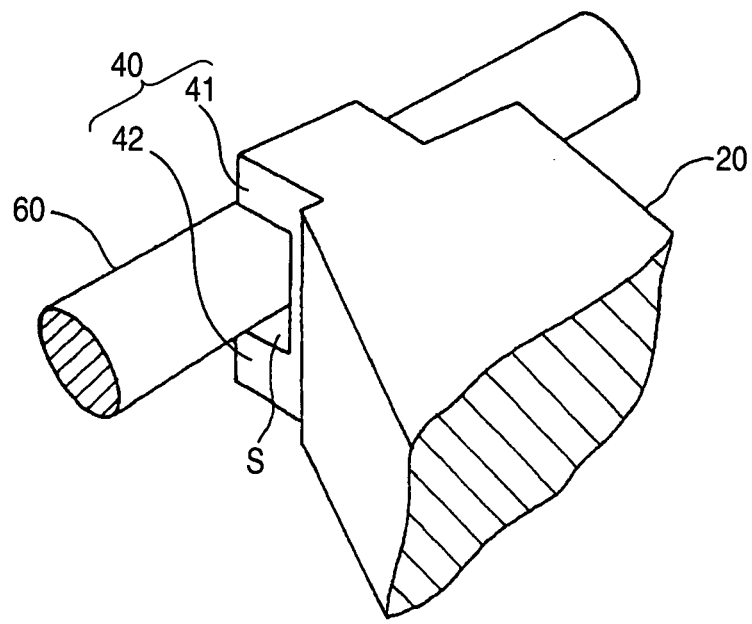
FIG. 9 is a schematic enlarged perspective view of an engagement portion.

In this embodiment, the engagement portion 40 (see FIG. 8) guided by the guide rail 60 can be molded by use of a general-purpose split-cavity mold moved toward a side of the base 20 for mold releasing, because it has the pair of upper and lower protruding pieces 41 and 42 as described with reference to FIG. 9 and the space between the protruding pieces 41 and 42 is open toward the side of the optical pickup.

Particularly in this embodiment, as shown in FIG. 4 through FIG. 6, only four surfaces of the lower surface 38a of the pressing piece 38 and the bottom surface 37a and the pair of opposing surfaces 37b of the concave portion 37 that are in contact with the guide shaft 50 are in contact with the surrounding four positions of the guide shaft 50 at the front bearing element 31. Further, since the three surfaces of the bottom surface 37a and the pair of opposing surfaces 37b of the concave portion 37 include a curved surface having a circular contour extending along the axis line of the guide shaft 50, not only are the three surfaces in contact with the guide shaft 50 at the surrounding three positions but also the respective three surfaces have line contact or point contact at the contact positions, so that the area of contact between the bearing 30 and the guide shaft 50 is significantly reduced to significantly reduce the load on the motor.

In the above-described embodiment, the bearing 30 is formed of the pair of front and rear bearing elements 31 and 32, the front bearing element 31 is formed of the concave portion 37 and the pressing piece 38 to enable molding not using a metal mold slide pin, and the rear bearing element 32 is provided with the round hole 33 molded by use of the metal mold slide pin 70. However, in this respect, the rear bearing element 32 may be formed of a concave portion and a protruding piece to enable molding not using a metal mold slide pin like the front bearing element 31. This structure enables the base 20 to be molded without the use of a metal mold slide pin. Moreover, the bearing 30 may be formed of a single bearing element without being divided into the pair of front and rear bearing elements 31 and 32.

Further, when the bearing 30 is formed of a concave portion having a shape that enables forming die extraction and a pressing piece pressing a guide shaft inserted in the concave portion to thereby prevent the guide shaft from coming out of an open part of the concave portion, the concave portion 37 may be substantially V-shaped as shown in FIG. 7. With this structure, since the guide shaft 50 is in contact with the three surfaces of the lower surface 38a of the pressing piece 38 and two slanting surfaces 37c of the V-shaped concave portion 37 only at three surrounding positions, the area of contact between bearing 30 and the guide shaft 50 is further reduced to further reduce the load on the motor.

Moreover, although not shown, the concave portion may be U-shaped.

As described above, according to the present invention, a demand for guiding the bearing of the base by the guide shaft with high accuracy without any backlash is easily satisfied, and further, the bearing can be molded of a synthetic resin integrally with the base without the use of a metal mold slide pin, or even if a metal mold slide pin is used, by use of a short metal mold slide pin and the area of contact between the bearing and the guide shaft can be reduced to reduce the load on the motor, so that the cost required for molding the base can be reduced. Further, since the area of contact between the bearing and the guide shaft is reduced compared to conventional ones and the load on the motor is reduced, the performance of disk scanning by the optical pickup improves, and a disk apparatus can be provided where problems due to reduction in scanning performance such as so-called audio skips and image distortion do not readily occur.

What is claimed is:

1. A disk apparatus having an optical pickup comprising:
   a base formed of a synthetic resin molding on which an optical system that scans a disk being rotated is mounted;
   a bearing slidably supported by a guide shaft that is circular in cross section; and
   an engagement portion guided by a guide rail disposed parallel to the guide shaft, wherein
   the base includes the bearing and the engagement portion;
   the guide shaft is inserted in a round hole having a cylindrical sliding surface for which a hole is provided in the bearing;
   the bearing includes a pair of front and rear bearing elements provided on one side end of the base and slidably supported by the guide shaft;
   the guide rail includes a round bar that is circular in cross section;
   the engagement portion has a pair of protruding pieces provided on the other side end of the base and slidably sandwiches the round bar in a longitudinal direction;
   instead of providing the round hole in the bearing, a concave portion having a shape that enables forming die extraction in a direction orthogonal to a direction of an axis line and a pressing piece pressing the guide shaft inserted in the concave portion to thereby prevent the guide shaft from coming out of an open part of the concave portion are provided on at least one of the bearing elements so as to be displaced in the direction of the axis line;

the concave portion has a bottom surface slidably sandwiching the guide shaft in the longitudinal direction in cooperation with a flat surface of the pressing piece and a pair of opposing surfaces provided so as to rise from both ends of the bottom surface and slidably sandwiching the guide shaft in a lateral direction;

the flat surface of the pressing piece and the bottom surface and the pair of opposing surfaces of the concave portion constitute a sliding surface for the guide shaft; and the bottom surface and the pair of opposing surfaces of the concave portion are each formed as a curved surface extending in the direction of the axis line of the guide shaft.

2. A disk apparatus having an optical pickup comprising:

a base formed of a synthetic resin molding on which an optical system that scans a disk being rotated is mounted;

a bearing slidably supported by a guide shaft that is circular in cross section; and an engagement portion guided by a guide rail disposed parallel to the guide shaft, wherein the base includes the bearing and the engagement portion;

the guide shaft is inserted in a round hole having a cylindrical sliding surface for which a hole is provided in the bearing;

instead of providing the round hole in the bearing, a concave portion having a shape that enables forming die extraction in a direction orthogonal to a direction of an axis line and a pressing piece pressing the guide shaft inserted in the concave portion to thereby prevent the guide shaft from coming out of an open part of the concave portion are provided on the bearing so as to be displaced in the direction of the axis line; and an inner surface of the concave portion and a surface of the pressing piece constitute a sliding surface for the guide shaft.

3. A disk apparatus having an optical pickup according to claim 2, wherein the concave portion has a bottom surface slidably sandwiching the guide shaft in a first radius direction in cooperation with the surface of the pressing piece and a pair of opposing surfaces provided so as to rise from both ends of the bottom surface and slidably sandwich the guide shaft in a second radius direction orthogonal to the first radius direction.

4. A disk apparatus having an optical pickup according to claim 2, wherein the bearing comprises a pair of front and rear bearing elements slidably supported by the guide shaft, and at least one of the bearing elements has the concave portion and the pressing piece.

5. A disk apparatus having an optical pickup according to claim 2, wherein the guide rail comprises a round bar that is circular in cross section, and the engagement portion has a pair of protruding pieces slidably sandwiching the round bar in a radius direction.

* * * * *